United States Patent [19]
Petzing et al.

[11] 3,823,839
[45] July 16, 1974

[54] CARTOP CARRIER ELEVATOR

[76] Inventors: Robert C. Petzing; Betty H. Petzing, both of 1013 3rd St., Los Angeles, Calif. 90403

[22] Filed: May 8, 1972

[21] Appl. No.: 251,379

[52] U.S. Cl. .............................. 214/450, 214/75 R
[51] Int. Cl. ................................................ B60r 9/00
[58] Field of Search........ 214/450, 75 R, 75 H, 451; 224/42.1 H

[56] References Cited
UNITED STATES PATENTS

| | | | |
|---|---|---|---|
| 2,547,083 | 4/1951 | Lundgren | 214/451 |
| 2,715,974 | 8/1955 | Van Nest | 214/450 |
| 2,896,804 | 7/1959 | Ingram | 214/450 |
| 3,495,729 | 2/1970 | Kruse | 224/42.1 H |

Primary Examiner—Robert G. Sheridan
Assistant Examiner—John Mannix
Attorney, Agent, or Firm—William H. Maxwell

[57] ABSTRACT

An elevator mechanism for moving a cartop carrier between a ground level loading position and a roof level riding position, and comprised of a rack mounted onto the car top, a cradle shiftable laterally upon the rack between said loading position and said riding position, a carrier transported by the relative movement of the cradle and rack between said ground level positioning and said riding positioning, and coordinated means shifting the cradle and moving the carrier between said positions; the combination providing an enclosure in the riding position and which is automatically opened at the ground level positioning, and all of which is power automated.

12 Claims, 9 Drawing Figures

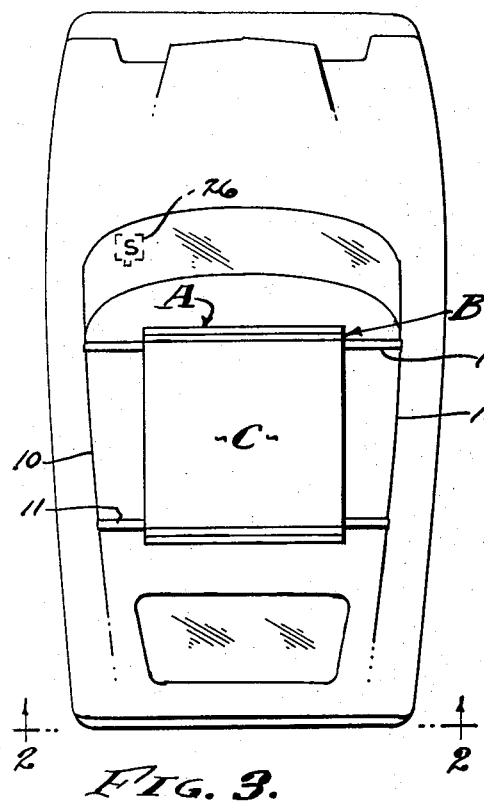
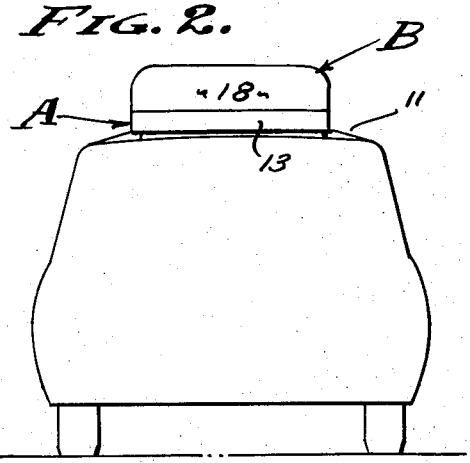
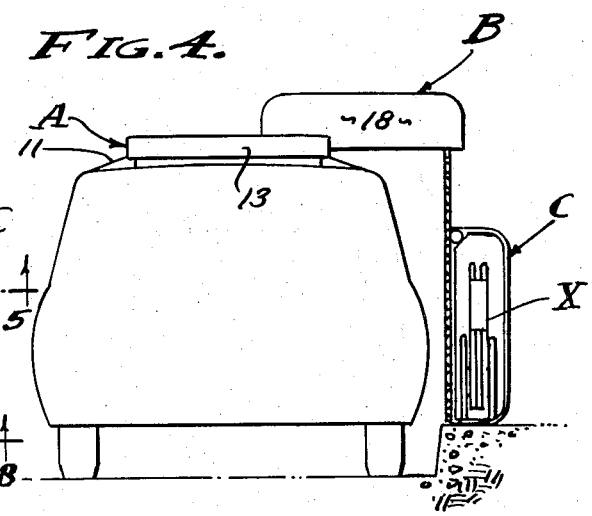

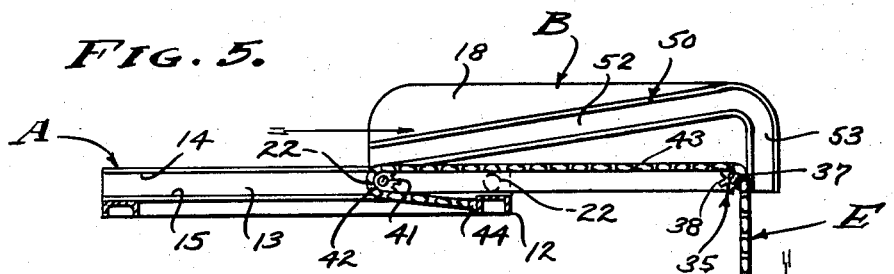
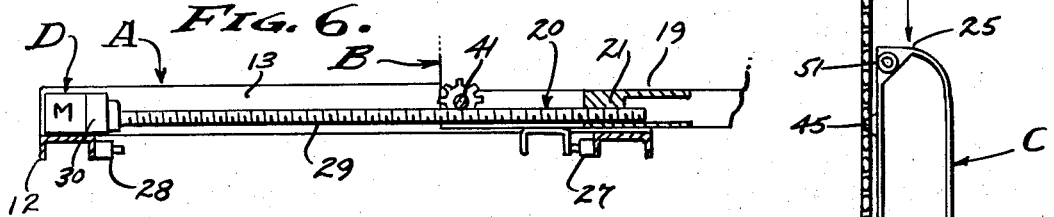
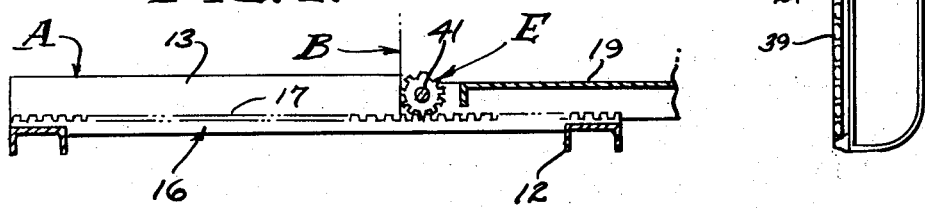
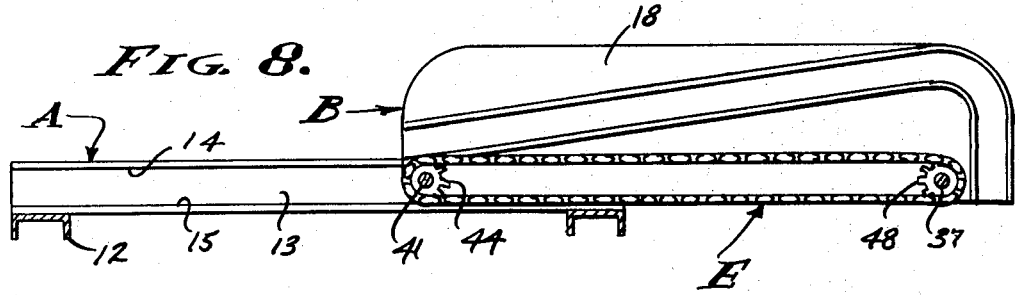
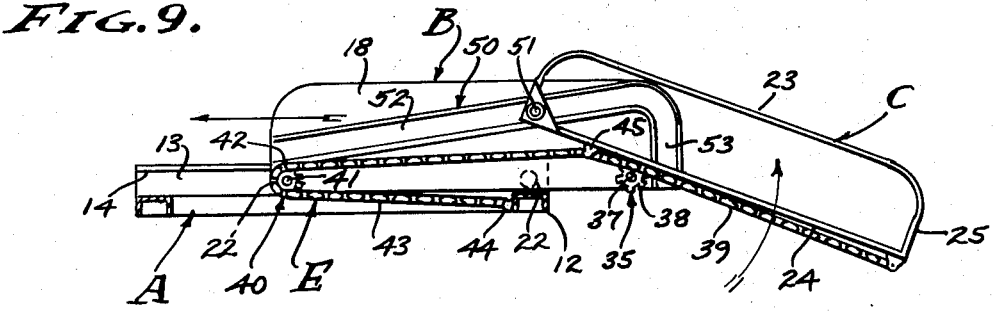

3,823,839

CARTOP CARRIER ELEVATOR

BACKGROUND

It is a primary purpose of the present invention to provide a practical means by which a person, and especially paraplegic or otherwise handicapped and/or incapable persons, may easily transport materials to and from the top of a motor car or the like. For example, a paraplegic person who is the driver of an automobile often requires the aid of a wheelchair which is at best a weighty and cumbersome piece of equipment that is difficult to store within the confines of a passenger compartment. As a matter of fact, paraplegic persons are often muscularly overtaxed in the process of loading wheelchairs into vehicles; usually loaded behind the driver's seat when said person is of necessity faced forwardly (partially at least) and in which case he must reach backwardly. The foregoing is but one instance of awkwardness and necessity, it being understood that many such circumstances could be alleviated by a device capable of transporting a load so as to move it between two extreme positions relative to a motor vehicle and namely between a ground level position and a car top riding position.

FIELD OF INVENTION

The transport of cargo, such as a wheelchair, onto and off of a car top requires the shifting of the load laterally into and out of riding position. To this end therefore, it is an object of this invention to provide a rack with means adapted to permit shifting of a cargo carrier and its support, and to the end that said carrier ascends and descends at the side of the car top, while its normal riding position is centrally located over the car top.

The transport of a cargo as stated above also requires the stability of the shifted load, and to this end therefore, it is an object of this invention to provide a carrier support in the form of a cradle that shifts alternately between the two extreme positions, namely a laterally extended loading position and a centralized riding position.

The height or elevation involved in the transport of cargo between the loading and riding positions stated requires a carriage, and to this end it is an object of this invention to provide a novel transporting carrier that moves between said extreme positions as required and under such control that clearance from the vehicle body is maintained.

The combined structural elements thus far referred to are so related as to provide an enclosure for the cargo being elevated and all of which is elevated by means the object of which is to coordinate the shifting and movement of the cradle and carrier respectively; it being a general object of this invention to provide a simple and practical cartop carrier which is automatic in operation to transport a cargo between street or sidewalk level and car top level, thereby offering the interior of the car free of the transported space consuming equipment such as a wheelchair or the like.

SUMMARY OF INVENTION

The cartop carrier elevator herein disclosed is especially adapted to aid paraplegic persons and to assist in any situation where there is difficulty for a person to load and unload a rack installed atop a vehicle body. Generally, this carrier elevator involves a rack A that is mounted onto the vehicle roof to carry the elements and means combined therewith, a cradle B that is carried by and shiftable laterally of the rack A to overlie the vehicle body, a carrier C that moves relative to the cradle B as shifting of the said cradle occurs in order to raise and lower a load accommodated thereby, and controlled cradle shifting means D and carrier transport means E responsive thereto to raise and lower the carrier C between the ground level loading position and the car top riding position.

DRAWINGS

The various objects and features of this invention will be fully understood from the following detailed description of the typical preferred form and application thereof, throughout which description reference is made to the accompanying drawings, in which: FIG. 1 is a plan view of an automobile with the cartop carrier elevator of the present invention installed thereon and in a centered riding position. FIG. 2 is a transverse end view taken as indicated by line 2—2 on FIG. 1. FIG. 3 is a view similar to FIG. 1 showing the cartop carrier elevator as it appears in the loading position. FIG. 4 is a transverse end view taken as indicated by line 4—4 on FIG. 3. FIG. 5 is an enlarged transverse sectional view of the cartop carrier elevator taken as indicated by line 5—5 on FIG. 3. FIGS. 6, 7 and 8 are enlarged sectional views taken as indicated by lines 6—6, 7—7 and 8—8 on FIG. 3. And, FIG. 9 is a view similar to FIG. 5 and shows the cartop carrier elevator in a position intermediate the positions shown in FIGS. 2 and 4.

PREFERRED EMBODIMENT

The cartop carrier elevator of the present invention is a unit of structural elements combined to shift and move coordinatedly and preferably powered so as to be automatic and responsive to manual control. The useful environment for the unit is at the top exterior of a vehicle body as shown in the drawings where the rack A is attached securely to the roof rails 10 as by means of anchors 11 according to usual practice. As shown, the unit is slightly narrower than the vehicle roof, although this is not always the case, so as to accommodate a load of substantial width; for example the height of a folded wheelchair X which substantially occupies the width of the unit as it is illustrated. It is to be understood that wheelchairs are constructed so as to fold into this collapsed and flattened condition. To these ends therefore, the unit made up of the elements and means now to be described is shown as it is especially designed to aid paraplegic persons and the like, and universally applicable to conventional motor cars having a supporting roof.

The rack A is a rigid frame-like structure of flattened rectangular configuration adapted to be fixed in a horizontal plane overlying the top of the vehicle. As is shown, the rack A is a rectangular form having spaced and parallel longitudinal members 12 and spaced and parallel transverse members 13 joining the former. In its simplist form, the two members 12 are secured to the rails 10 by the anchors 11, and the two members 13 form opposed tracks with spaced upper and lower rails 14 and 15 between which a wheeled support is operative as later described. Drive means 16 having coordination with the carrier transport means E is incorporated into the rack A and preferably in the form of a gear rack 17 disposed in transverse parallelism with the members 13 and adjacent to one of said rails and for instance a lower rail 15. Thus, the gear rack 17 faces upwardly so as to engage a drive pinion of means 16, later described.

The cradle B is a rigid frame-like structure of flattened rectangular configuration adapted to occupy the space between the transverse members 13 of frame A when in a centered riding position. As is shown, the cradle B is a rectangular form having spaced and parallel transverse members 18 that lie immediately within the confines of the aforementioned rack members 13 and spaced free therefrom. Although the cradle structure can vary, the transverse members 18 thereof are shown fixed relative to each other by means of a frame 19 of modified X formation. In the preferred form, the cradle B cooperates with the carrier C to establish an enclosure for the load when it is centered in riding position, and to this end the transverse members 18 are in the nature of spaced parallel end walls in the form of flat planar panels of restricted height coextensive with the transverse extent of the cradle.

As is shown, the unit is operative to lift and lower a load at one side of the vehicle upon which it is installed, in this case illustrated at the right side of the vehicle (reversal is a matter of choice). Therefore, drive means 20 for coordination at the cradle shifting means D is incorporated into the cradle B and preferably in the form of a nut 21 placed at the side thereof remote from the loading side. The nut 21 is fixedly disposed on a horizontal transverse axis so as to cooperate with a drive screw of means D that revolves in order to shift the cradle. In accordance with the invention, the cradle B is substantially coextensive with the rack A when centered therein, and is provided with spaced wheels 22 that operate between the rails 14 and 15 and spaced along members 18 so as to permit shifting of the cradle B into loading position cantilevered to and/or somewhat beyond the loading side of the vehicle body.

The carrier C is a rigid frame-like structure of rectangular configuration adapted to move between the transverse members 18 of cradle B, and in the preferred form is a box-like structure having top and bottom walls 23 and 24 and opposite side walls 25. The walls 23 and 24 correspond in transverse extend to the width of rack A and cradle B, while the walls 25 correspond in vertical extend to the height of the end wall members 18 of the cradle B. The carrier C is therefore tubular in cross section and is clear of and free to move within the confines of members 18 to be closed thereby when placed centrally in riding position.

In accordance with this invention, the cradle shifting means D is provided to shift the cradle B in a horizontal plane guided by the wheels 22 operating between the rails 14 and 15. Although the means D can be manually operable, as by revolving a crank, it is preferably powered by a reversible motor M responsive to a manually operable reverse switch 26, and its range of effect restricted by limit switches 27 and 28. Fundamentally, the cradle shifting means D is a device for selectively positioning the cradle, either centrally of the rack A or laterally displaced from said central position. In the preferred form the means D is a screw 29 threadedly engaged in nut 21 above described, being rotatable on said transverse axis and reversely driven by the motor M. Thus, the motor can be manually controlled by switch 26 to shift the cradle B laterally until motion thereof is restricted by limit switch 27; and also to return toward centered position until motion thereof is again restricted by limit switch 28. In practice, the motor M rotates the screw 29 through a speed reducing drive 30, all of which is located at the said remote side of the unit.

In accordance with this invention, the carrier transport means E is provided to move the carrier C between a centered and horizontally disposed riding position and a laterally displaced and vertically disposed loading position. The first mentioned riding position is the elevated position on the rack A and occupying the space between the transverse wall members 18 of the cradle B, while the second mentioned position is the lower position at the side of the vehicle where the carrier C depends from the centilevered extended side of the cradle. The transport of carrier C between said two extreme positions requires right angular revolvement thereof through 90° displacement. To these ends the carrier transport means E involves extension means 35 that retractably extends the carrier C from the cradle B and lift or winch means 40 cooperatively combined therewith that retractably lowers the carrier C from the cradle B.

Referring now to the coordinated retractile extension and retractile lowering of the carrier C from the cradle B, it is a feature of the present invention to motivate these two means through the relative motion between rack A and cradle B as effected by the cradle shifting means D hereinabove described. Accordingly, the means 35 and 40 are motivated by the drive means 16 referred to in connection with the rack A and which involves the gear rack 17 and a drive pinion 46 that operates the coordinated means 35 and 40. As shown, the drive means 16 involves a pair of operating shafts 41 and 37 of the winch means 40 and extension means 35 respectively.

The extension means 35 involves the operating shaft 37 which is on a longitudinally disposed axis at the loading side of the cradle B and journaled on suitable bearings positioned in the transverse members 18 respectively. The shaft 37 carries at least one and preferably spaced rollers, gears or sprockets 38 which engage the lower surface or racks 39 or the like underlying the bottom 24 of the carrier. In practice the rack 39 is link chain the same as the flexible element of means 40 next to be described. The rack 39, or portion of chain comprising the same, is secured to the bottom 24 and the sprocket 38 is revolved by shaft 37 to either extend or retract the carrier C from the loading side of cradle B.

The winch means 40 involves the operating shaft 41 which is on a longitudinally disposed axis at the said remote side of the cradle B opposite the loading side thereof, and journaled on suitable bearings positioned in the transverse members 18 respectively. The shaft 41 carries at least one drum or lift sprocket 42, and preferably the latter, over which a flexible element 43, preferably a link chain, is driveably extended between an anchor 44 of the rack A and live end 45 continuing from the rack 9 on carrier C. In practice, there is a pair of spaced winch sprockets and chains extending to complementary racks 39 of extension means 35.

In accordance with the invention the drive means 16 involves the aforementioned drive pinion and a transmission between the two operating shafts 37 and 41, and to this end the drive pinion is carried by shaft 41 to be revolved by lateral shifting of cradle B. A transmission chain 47 extends between sprockets 48 and 49 on the spaced shafts 37 and 41, whereby simultaneous operation of the means D and E is effected. Consequently, the flexible element 43 pays out as the carrier C is extended from the cradle B, and conversely the flexible element 43 is drawn in when the carrier C is retracted onto the cradle B.

From the foregoing it will be seen that the carrier C is driven to extend from the cradle B when the cradle shifts laterally to the loading side of the rack A; and reversely when retracted. As and when the center of gravity of the carrier C passes over the supporting sprocket or sprockets 38, an overbalance occurs which causes rotation of the carrier into the vertical plane to be followed by lowering to the street or sidewalk level and the loading position. Controlled rotation of the carrier C is provided for in means F in the form of a cam 50 and follower 51 which governs rotation of the carrier in its transition over the supporting sprockets 38. As shown, there is a cam at opposite cradle members 18 and coaxial followers 51 in the form of rollers at the remote side 25 of the carrier. The cams 50 are in the form of complementary tracks in the transverse wall members 18 of the cradle B. Each cam track 50 has a section 52 that is inclined upwardly and transversely from the remote side of the cradle B to the loading side thereof so as to initiate rotation of the carrier C as it is moved to extend from the cradle, and a turned-down section 53 which causes lowering when the rotational transition is initially completed; and reversely when retracted. Thus, clearance from the vehicle body is maintained and uncontrolled swinging is eliminated.

Having described only the typical preferred form and application of our invention, we do not wish to be limited or restricted to the specific details herein set forth, but wish to reserve to outselves any modifications or variations that may appear to those skilled in the art:

I claim:

1. An elevator for car tops and the like to transport a load between a laterally displaced loading position and a centered elevated riding position, and including; a horizontally disposed rack fixed over the car top and having transverse guide means, a cradle shiftably carried by the guide means with cam and follower means operating between the carrier and cradle controlling rotational displacement of the carrier from a vertical disposition when in the loading position displaced laterally to one side to a horizontal disposed when in the riding position centered with the rack, a carrier extensibly carried by the cradle to move between the loading position depending at said side and the riding position centered with the cradle and rack, and coordinated carrier extension means and lift means responsive to cradle shifting means to transport the carrier between said laterally displaced loading position and said centered elevated riding position.

2. The cartop carrier elevator as set forth in claim 1, wherein the cradle has longitudinally spaced transversely disposed end walls, and wherein the carrier is a longitudinally open ended box accessible when in the said loading position and enclosed between said end walls when in the said riding position.

3. An elevator for car tops and the like to transport a load between a laterally displaced loading position and a centered elevated riding position, and including; a horizontally disposed rack fixed over the car top and having transverse guide means, a cradle shiftably carried by the guide means between a position displaced laterally to one side and a position centered with the rack, a carrier extensibly carried by the cradle to move between the loading position depending at said side and the riding position centered with the cradle and rack, and coordinated roller support and extension means for the carrier and lift means responsive to cradle shifting means to transport the carrier between said laterally displaced loading position and said centered elevated riding position.

4. The cartop carrier elevator as set forth in claim 3 wherein the roller support and extension means for the carrier comprises a gear rack on the carrier supported by a driven sprocket journaled on the cradle.

5. The cartop carrier elevator as set forth in claim 3 wherein the roller support and extension means for the carrier comprises a gear rack on the carrier supported by a driven sprocket journaled on a longitudinally disposed axis at the loading side of the cradle.

6. The cartop carrier elevator as set forth in claim 3 wherein the lift means comprises a flexible link chain anchored to the rack and engaged over a sprocket on the cradle and extending to the side of the carrier remote from the loading side of the elevator.

7. The cartop carrier elevator as set forth in claim 3 wherein the lift means comprises a flexible link chain anchored over a sprocket driven by geared engagement with the cradle and extending to the side of the carrier remote from the loading side of the elevator.

8. The cartop carrier elevator as set forth in claim 3 wherein the lift means comprises a flexible link chain anchored to the rack and engaged over a sprocket on the cradle and driven by a gear rack on said first mentioned rack and extending to the side of the carrier remote from the loading side thereof.

9. The cartop roller elevator as set forth in claim 3 wherein the carrier support and extension means for the carrier comprises a link chain fixed against the carrier and engaged with a support and drive sprocket on a longitudinally disposed axis at the loading side of the cradle, and wherein the lift means comprises an extension of said link chain anchored to the rack and engaged over a sprocket on the cradle and extending to the side of the carrier remote from the loading side thereof.

10. The cartop roller elevator as set forth in claim 3 wherein the carrier support and extension means and the lift means for the carrier are operated by separate shafts driven one from the other at the loading side and remote side of the cradle respectively.

11. An automated elevator for car tops and the like to transport a load between a laterally displaced loading position and a centered elevated riding position, and including; a horizontally disposed rack fixed over the car top and having transverse guide means, a cradle shiftably carried by the guide means between a position displaced laterally to one side and a position centered with the rack, a carrier extensibly carried by the cradle to move between the loading position depending at said side and riding position centered with the cradle and rack, coordinated roller support and extension means for the carrier and lift means responsive to cradle shifting means and reversible drive means operating the same to transport the carrier between said laterally displaced loading position and said centered elevated riding position.

12. The cartop carrier elevator as set forth in claim 11 wherein the reversible drive means comprises a motor drive having a manually actuated reverse switch limited to movement thereof by opposite limit switches responsive to arrival at said extreme loading and riding positions respectively.

* * * * *